Jan. 18, 1966   W. J. KOINZAN   3,229,668
CATTLE OILER

Filed July 31, 1964   2 Sheets-Sheet 1

Walter J. Koinzan  INVENTOR.

BY
Attorneys

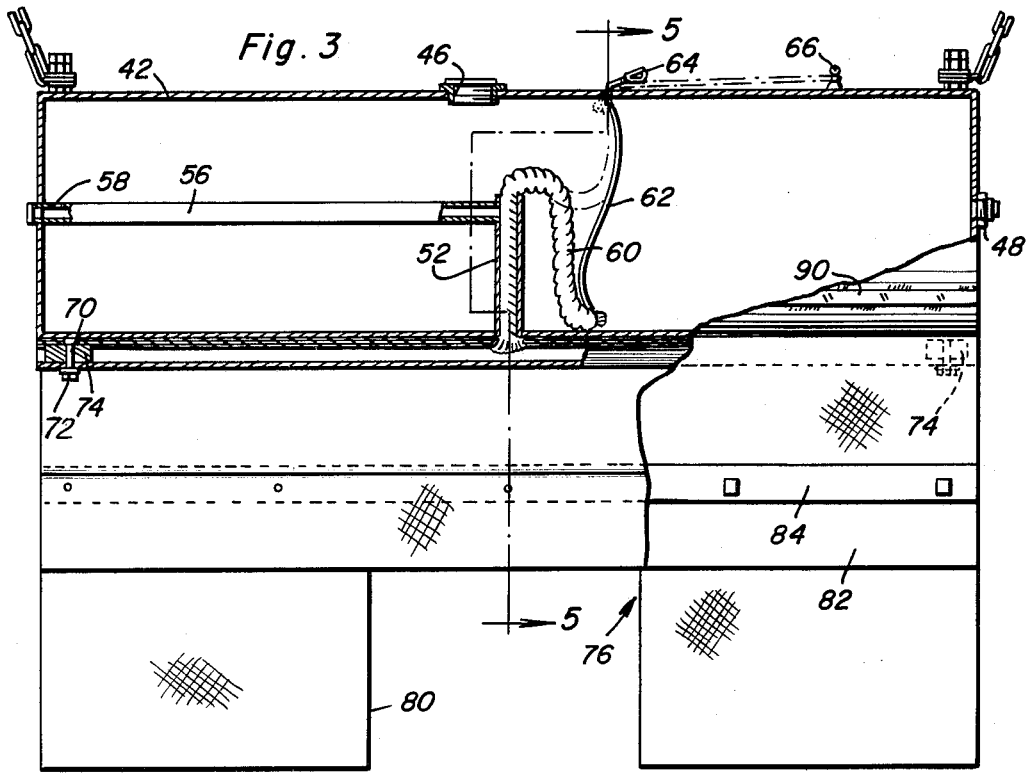
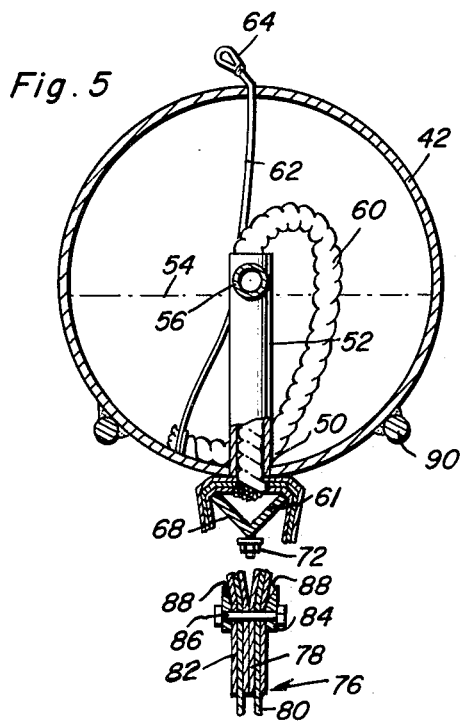
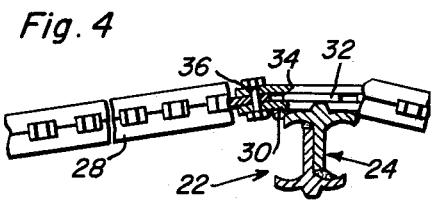
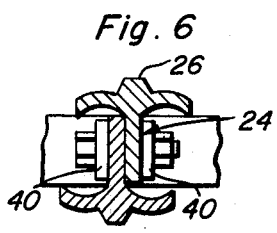
Walter J. Koinzan
INVENTOR.

United States Patent Office 3,229,668
Patented Jan. 18, 1966

3,229,668
CATTLE OILER
Walter J. Koinzan, Koinzan Flying Service, Elgin, Nebr.
Filed July 31, 1964, Ser. No. 386,537
7 Claims. (Cl. 119—157)

The instant invention relates to new and useful improvements in cattle oilers, and is more particularly directed toward a combined oiler and rubbing station which incorporates means for constantly supplying the flexible applicator with the oil, and also providing for the supply of an increased amount of oil when needed.

It is a significant object of the instant invention to provide a cattle oiler of the type wherein the oil is dispensed upon a physical movement of the oil reservoir by the cattle.

In conjunction with the above object, it is an object of the instant invention to provide such an oiler wherein a constant flow of oil, from the reservoir, can be provided, this being particularly useful in the case of the use of the device by small or inactive animals.

Further, it is an object of the instant invention to provide an oiler which includes both a minimum constant supply of liquid to the applicator means, and a periodic increased flow of liquid.

Another object of the instant invention, is in conjunction with the above object, the provision of means for selectively cutting off the continuous supply of liquid oil to the applicator means.

Likewise, it is an object of the instant invention to provide oil-applying aprons on the oiler which are formed so as to induce a movement of the animals therebeneath in a manner contemplated to provide a maximum degree of coverage, particularly about the sensitive face and head of the animals.

Also, it is an object of the instant invention to provide a combination oiler and rubbing station which, while collapsible and capable of being dragged across the ground, is of a highly stable nature economical to construct, and able to provide continuous effective service over extended periods of time.

Basically, the above objects are achieved through the utilization of an oiler which includes a generally horizontal oil or liquid reservoir hung from an enlarged collapsible frame. This reservoir includes a liquid trough engaged along the bottom thereof, the trough communicating with a pair of depending longitudinally spaced apron-like oil applicators. The oil is introduced into the liquid trough, from the reservoir, through an elongated liquid conduit located in the reservoir normally above the level of the liquid, this conduit having a hole at one end thereof adjacent the end of the reservoir while the other end of the conduit communicates, through an elongated tube, with the liquid trough, whereby a tipping of the reservoir is required so as to allow the liquid to flow into the hole of the conduit and from there through the conduit and into the trough. In addition, a wick is provided with one end thereof in communication with the central portion of the trough, and with the other end thereof seletcively insertable into the liquid contained in the reservoir, whereby, if desired, a constant supply of liquid can be provided to the trough by the wick. Incidentally, it will also be noted that a pair of liquid channels are provided by the binding straps or slats on the outer faces of the aprons so as to ensure an even distribution of the oil therealong.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged cross-sectional view taken substantially on a plane passing along line 3—3 in FIGURE 2;

FIGURE 4 is an enlarged partial cross-sectional view taken substantially on a plane passing along line 4—4 in FIGURE 2;

FIGURE 5 is a cross-sectional view taken substantially on a plane passing along line 5—5 in FIGURE 3; and FIGURE 6 is an enlarged partial cross-sectional view taken substantially on a plane passing along line 6—6 in FIGURE 2.

Figure 1:
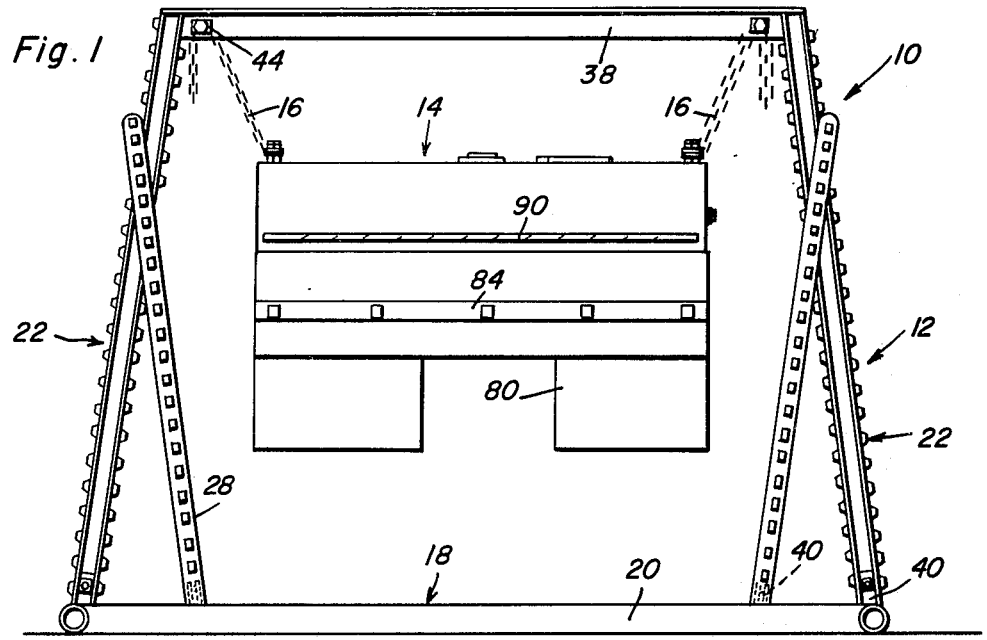
FIGURE 1 is a side elevational view of the device of the instant invention.
Figure 2:
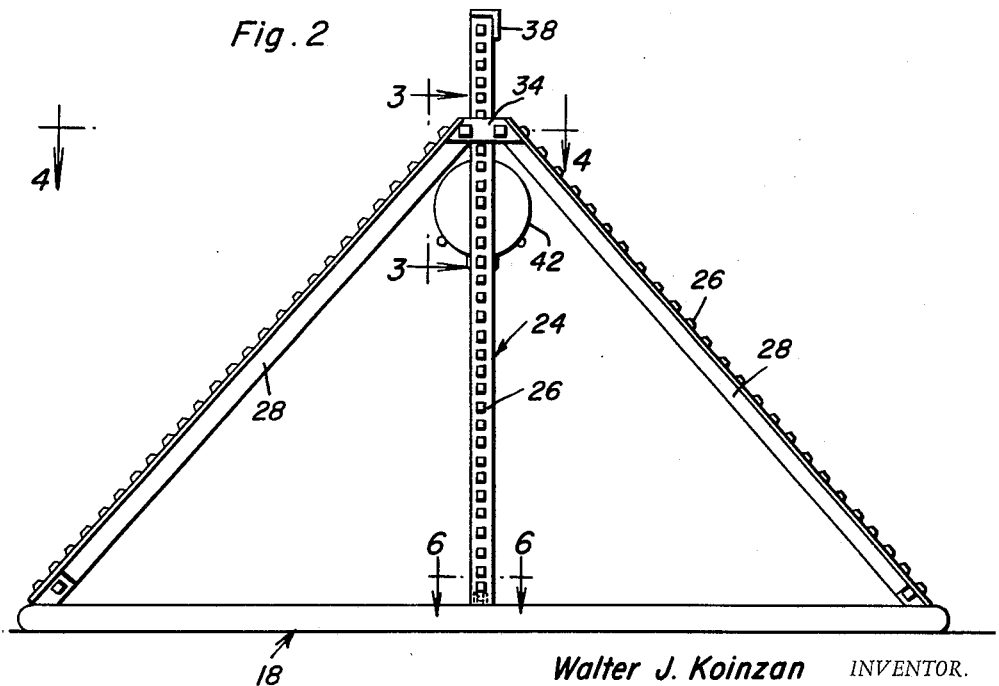
FIGURE 2 is an end elevational view of the device of the instant invention.

Referring now more specifically to the drawings, reference numeral 10 is used to generally designate the oiler comprising the instant invention. This oiler 10 includes a collapsible stand 12 and an oil or liquid reservoir and applicator 14 suspended from the frame through flexible means such as link chains 16.

The stand 12 includes a rectangular base 18 constructed of welded tubular pipe sections 20. As will be appreciated, such a base 18 can, during use, be dragged from one location to another, this base acting in the manner of a skid support for the entire oiler 10.

Projecting upwardly from centrally located points on opposite ends of the base 18 are a pair of slightly converging support legs 22. These legs 22, as will be appreciated from FIGURES 4 and 6, consist of a pair of studded T-bars 24 having the stems thereof welded to each other so as to face the tops thereof in opposite directions, these tops each having a series of rubbing studs 26 therealong. Each of the legs 22 is braced by a pair of converging braces 28, also in the form of studded T-bars, which extend from opposite sides of the base 18, inward of the corresponding base end, in converging relation to each other for bracing engagement with the corresponding leg 22 at a point closer to the upper end of the leg 22 than the bottom end. This engagement of the braces 28 with the leg 22 is best seen in FIGURE 4, and consists of a first plate 30 welded to the outer T-bar 24, a spacer strip 32, and an outer plate 34, the upper ends of the stems of the T-shaped braces 28 being sandwiched between the plates 30 and 34 with bolts 36 releasably clamping or locking the assembly together.

Finally, a horizontally extending angle bar 38 is releasably bolted to the upper ends of the legs 22, thereby interlocking these upper ends and providing for the suspension of the combination oil reservoir and applicator means 14.

In order to allow for the complete collapsing of the stand, the lower ends of the legs 22 and braces 28 are releasably bolted to the base 18 through, for example, pairs of upwardly projecting ears 40 welded to the base 18 and projecting upwardly therefrom. In this manner, by merely removing the releasable connectors, the entire stand can be collapsed into a flat package for transportation or storage.

The above described structure basically constitutes the rubbing station portion of the device in addition to the means for mounting the oiler portion of the device. The oiler portion 14 of the instant invention consists basically of an elongated cylindrical reservoir 42 positioned horizontally between the support legs 22 by the flexible support cables or chains 16 engaged with the opposite ends thereof, these chains 16 being adjustable through a selective engagement of the links with suitable projections or headed rods 44 on the horizontal crossbar 38 adjacent the ends thereof.

The reservoir or tank 42 includes a capped filling hole 46 centrally located through the top thereof, a capped drain hole 48 at one end thereof, and a single discharge hole 50 centrally located in the bottom thereof. Fixed within the reservoir 42 is a vertical tube 52, the lower end of which is sealed within the discharge aperture 50 and the upper end of which projects above the normal level of the liquid, this level being generally indicated by reference numeral 54 in FIGURE 5.

Extending longitudinally through the reservoir 42 from one end thereof into communication with the vertical tube 52 below the upper end thereof and above the normal liquid level 54 is a horizontal liquid conduit 56. This conduit 56, aside from the end in communication with the tube 52 and a hole 58 therethrough adjacent the end of the reservoir 42, is imperforate. The hole 58 is through the top of the conduit 56, which in turn, as mentioned supra, is above the normal level of the liquid, thereby requiring a physical inclination of the reservoir if the liquid is to be introduced into the hole 58 for subsequent movement through the conduit 56 and down the tube 52.

Completely filling the tube 52 is an elongated highly absorbent wick 60 which has the lower end thereof projecting below the reservoir 42 into a fluid trough 61. The opposite end of the wick 60 is of a length so as to project out of the upper end of the tube 52 and down to the bottom of the reservoir 42, in this manner providing a constant relatively slow flow of liquid as long as any liquid remains in the reservoir 42.

For those instances wherein a continuous supply of oil is not wanted, such as when the cattle or livestock are not using the device, or when the animals are so active as to ensure a continuous supply of oil through the conduit 56, a control cable 62 is provided. This cable 62 has one end thereof secured to the free end of the wick 60 and projects therefrom through a small hole in the top of the reservoir 42 where it is provided with a ring or loop handle 64 whereby one need merely pull on this handle 64 so as to provide for a vertical movement of the free end of the wick above the liquid level 54. In order to fix the free end of the wick 60 above the liquid level 54, a vertical stud 66 is provided for receiving the loop handle 64 thereover.

The liquid or oil trough 61 is formed by an angle bar 68 extending along the full length of the reservoir 42 and bolted thereto by a pair of threaded bolts 70 welded to the bottom of the reservoir 42 adjacent the opposite ends thereof, these bolts 70 extending through apertures in the angle bar 68 and having suitable nuts 72 threaded on the lower ends thereof so as to clamp the angle bar 68 upwardly into sealing engagement with the bottom of the reservoir 42. As will be noted in FIGURE 3, suitable sealing blocks 74 are provided at opposite ends of the trough 61 so as to prevent any leakage therethrough.

The oil is actually applied to the livestock through flexible absorbent applicator means 76. This applicator means 76 consists of a first elongated strip of flexible absorbent material 78, generally canvas, folded in half over the angle bar 68, a pair of aprons 80, also of similar material, longitudinally spaced from each other and folded over the angle bar 68 on top of the strip 78 so as to form a pair of depending panels on each side of the bar 68, these panels projecting a substantial distance below the lower edge of the strip 78 as well be appreciated from FIGURE 3. Finally, a second strip 82, similar to the first strip 78, is folded over the angle bar 68 on top of the aprons 80, the strips 78 and 82, and the aprons 80 being fixedly clamped between the angle bar 68 and the bottom of the reservoir 42 through the nuts 72 threaded on the bolts 70. The wick 60 of course extends through this material and into the interior of the trough 61, as will be seen in FIGURES 3 and 5.

A pair of wooden slats 84 are provided on opposite sides of the applicator means 76 below the trough 61 and above the lower edges of the canvas strips 78 and 82. These slats 84 are releasably bolted together by threaded bolts and nuts 86 in a manner so as to clamp the material therebetween so as to both hold the material together and also induce an even flow of the liquid throughout the entire length of the applicator means 76. In order to facilitate this flow of liquid along the length of the applicator means 76, it will be noted, in FIGURE 5, that each of the slats 84 has the upper edge thereof beveled as at 88 so as to form, in conjunction with the material, a full length liquid channel.

In order to provide additional rubbing space for the cattle, as well as to induce them to tip the reservoir 42 so as to provide for the dispensing of the oil through the conduit 56, a pair of elongated rubbing bars 90 are welded there along on each side thereof, these rubbing bars 90 being preferably in the form of ribbed reinforcing rods.

In operation, the stand is erected in the desired location, or moved thereto through its skid-like base, the reservoir is suspended from the frame in a substantially horizontal position, and liquid is filled into the reservoir to a level below the conduit 56 and upper end of the tube 52. The wick 60, having one end thereof constantly in communication with the oil trough 61 and the other end within the bottom of the reservoir 42, provides a constant slow flow of oil to the applicator strips and aprons so as to maintain these in a constantly moist condition. In addition, any engagement of the cattle with the reservoir 42 itself will tend to cause a raising thereof sufficient so as to allow for a flow of the liquid into the hole 58, and from there through the conduit 56 and tube 52 into the trough 62, thereby providing an increased supply of oil on the applicator aprons 80. It will be appreciated that by maintaining a basic amount of the oil in the aprons 80 through the wick 60, not only is the additional oil flowing through the conduit 56 quickly absorbed, but a constant supply of oil is always present even when the cattle are not active enough so as to tip the reservoir so as to provide for the increased flow. In the event that no flow is desired, or in those situations when there is sufficient activity among the livestock so as to ensure a constant supply of oil through the conduit 56, the wick 60 can be moved above the level of the liquid within the reservoir through an externally accessible control cable 62.

As noted supra, the aprons 80 are spaced longitudinally from each other with the distance therebetween being spanned by the substantially shorter strips 78 and 82. In this manner, there will be a much greater tendency for the cattle to walk directly beneath the reservoir, thus ensuring a complete coverage, especially around the face and head. This increase of the likelihood of the cattle passing beneath the reservoir 42 so as to engage the face and head arises from the relative willingness of the cattle to move through a barrier, even a flexible barrier, when the other side is visible. In other words, if the aprons were continuous along the full length of the reservoir 42, there would be a reluctance on the part of the cattle to poke their heads therethrough or move therebeneath. This is avoided in the instant device by providing, in effect, a cutout portion. Incidentally, it should be appreciated that this space between the aprons provides additional edges as well as an increased maneuverability in ensuring a complete application of the oil to the cattle coming in contact therewith. It will also be appreciated that, in many instances, the slats 84 will themselves be used as scratching bars by the cattle, with the portions of the strips between the aprons also applying oil to the portions of the cattle coming in contact therewith during movement of the cattle.

From the foregoing, it will be appreciated that a highly novel cattle oiler and rubbing station has been defined, the oiler ensuring a constant flow of oil in conjunction with means for providing a heavier flow of oil in those instances of increased activity on the part of the cattle themselves, this increased activity generally resulting from the presence of irritants, such as insects, which indicate the desirability of a heavier application of the oil or liquid insecticide. In this manner, the oiler not only provides for a constant preventive application of oil, but also heavier applications in response to increased agitation on the part of the cattle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cattle oiler comprising a stand, an elongated tubular liquid reservoir, means suspending the reservoir from the stand in a normally horizontal position, said means enabling a vertical movement of one end of the reservoir relative to the other, an elongated liquid trough fixed to the reservoir immediately therebelow, applicator means communicated with the interior of the trough and depending therebelow for engagement by livestock, a substantially horizontal tubular conduit fixed in said reservoir above the bottom thereof, a substantially vertical tube centrally located in the reservoir and having its lower end opening into the liquid trough through the bottom of the reservoir, said conduit extending longitudinally in said reservoir from one end to said vertical tube, said conduit being in liquid transferring communication with said tube, said conduit having a hole through the top thereof adjacent said one end, the liquid level in the reservoir normally being below the conduit whereby a tipping of the reservoir is necessary to introduce liquid into the hole in the conduit for subsequent discharge into the liquid trough through the tube, and means communicated with the liquid trough for maintaining a constant supply of liquid in the trough, said last mentioned means consisting of an elongated absorbent wick extending through the substantially vertical tube with one end thereof projecting from the lower end of the tube into the trough, and with the other end thereof projecting from the upper end of the tube and down below the liquid level, the upper end of the tube being above the liquid level.

2. The structure of claim 1 including means for selectively raising said other end of the wick above the liquid level.

3. The structure of claim 2 wherein said last mentioned means includes an elongated control cable accessible from the exterior of the reservoir.

4. The structure of claim 3 wherein said applicator means consists of a plurality of depending, flexible, generally adsorbent aprons, said aprons being spaced from each other along the length of the trough so as to provide a clear line of sight for inducing movement of livestock therethrough.

5. The structure of claim 1 wherein said trough includes an open top directed upwardly toward the bottom of the reservoir, said applicator means consisting of at least one apron folded over the top of the trough forming a pair of depending panels, one on each side thereof, means securing the trough to the bottom of the reservoir with the apron clamped therebetween, and a pair of elongated slats, said slats being positioned in opposed relation to each other on opposite sides of the apron slightly below the trough and generally parallel thereto, and bolt means extending through the slats and clamping the apron panels therebetween, each of said slats having the upper edge thereof bevelled downwardly and inwardly toward the apron so as to form a liquid channel for spreading liquid along the full length of the applicator means.

6. The structure of claim 5 wherein said stand includes an enlarged ground-engaging base, a pair of rigid bars projecting generally vertically from opposite sides of the base, a horizontal bar extending between and fixed to the upper ends of the generally vertical bars, and a plurality of bracing bars engaged between the base and generally vertical bars, all of said bars being releasably locked into position as to allow for a collapsing of the stand, said reservoir being suspended from the horizontal bar, the vertical bars and the bracing bars including series of rubbing projections thereon.

7. A cattle oiler comprising a stand, an elongated tubular liquid reservoir, means suspending the reservoir from the stand in a normally horizontal position, said means enabling a vertical movement of one end of the reservoir relative to the other, an elongated liquid trough fixed to the reservoir immediately therebelow, application means communicated with the interior of the trough and depending therebelow for engagement by livestock, a substantially horizontal tubular conduit fixed in said reservoir above the bottom thereof, a substantially vertical tube centrally located in the reservoir and having its lower end opening into the liquid trough through the bottom of the reservoir, said conduit extending longitudinally in said reservoir from one end to said vertical tube, said conduit being in liquid transferring communication with said tube, said conduit having a hole through the top thereof adjacent said one end, the liquid level in the reservoir normally being below the conduit whereby a tipping of the reservoir is necessary to introduce liquid into the hole in the conduit for subsequent discharge into the liquid trough through the tube, and means communicated with the liquid trough for maintaining a constant supply of liquid in the trough, said trough including an open top directed upwardly toward the bottom of the reservoir, said applicator means consisting of at least one apron folded over the top of the trough forming a pair of depending panels, one on each side thereof, means securing the trough to the bottom of the reservoir with the apron clamped therebetween, and a pair of elongated slats, said slats being positioned in opposed relation to each other on opposite sides of the apron slightly below the trough and generally parallel thereto, and bolt means extending through the slats and clamping the apron panels therebetween, each of said slats having the upper edge thereof bevelled downwardly and inwardly toward the apron so as to form a liquid channel for spreading liquid along the full length of the applicator means.

References Cited by the Examiner
UNITED STATES PATENTS

| | | | |
|---|---|---|---|
| 2,961,998 | 11/1960 | Hesse | 119—157 |
| 2,998,803 | 9/1961 | Worden | 119—157 |
| 3,071,111 | 1/1963 | Hamilton | 119—157 |
| 3,079,893 | 3/1963 | Francisco | 119—157 |

SAMUEL KOREN, *Primary Examiner.*

HUGH R. CHAMBLEE, *Examiner.*